US010167890B2

(12) United States Patent
Steffenfauseweh et al.

(10) Patent No.: US 10,167,890 B2
(45) Date of Patent: Jan. 1, 2019

(54) PLUG-IN COUPLING HAVING AN ELASTICALLY DEFORMABLE COUPLING PART AND INSTALLATION METHOD THEREFOR

(71) Applicant: BÖLLHOFF VERBINDUNGSTECHNIK GMBH, Bielefeld (DE)

(72) Inventors: Sandra Steffenfauseweh, Verl (DE); Wolfgang Hesse, Rietberg (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 270 days.

(21) Appl. No.: 14/897,490

(22) PCT Filed: May 30, 2014

(86) PCT No.: PCT/EP2014/061265
§ 371 (c)(1),
(2) Date: Dec. 10, 2015

(87) PCT Pub. No.: WO2014/198562
PCT Pub. Date: Dec. 18, 2014

(65) Prior Publication Data
US 2016/0108950 A1 Apr. 21, 2016

(30) Foreign Application Priority Data
Jun. 12, 2013 (DE) .............. 20 2013 005 336 U

(51) Int. Cl.
*F16D 1/00* (2006.01)
*F16B 21/04* (2006.01)
*F16B 21/07* (2006.01)

(52) U.S. Cl.
CPC ............ *F16B 21/04* (2013.01); *F16B 21/075* (2013.01); *Y10T 403/75* (2015.01)

(58) Field of Classification Search
CPC .......... E05B 79/16; E05B 79/20; F16C 1/102; F16C 1/105; F16C 2226/72;
(Continued)

(56) References Cited
U.S. PATENT DOCUMENTS 2,610,879 A * 9/1952 Pope ................... F16B 2/08
                                                 24/704.2
3,749,431 A * 7/1973 Schmid ................. B60S 1/24
                                                  403/122
(Continued)

FOREIGN PATENT DOCUMENTS

DE    3937636 A1    5/1990
DE   19838560 A1    3/2000
(Continued)

OTHER PUBLICATIONS

English translation of the International Preliminary Report on Patentability for PCT/EP2014/061265 dated Dec. 15, 2015, 7 pages.
(Continued)

*Primary Examiner* — Amber R Anderson
*Assistant Examiner* — Nahid Amiri
(74) *Attorney, Agent, or Firm* — Reising Ethington P.C.

(57) ABSTRACT

An elastically deformable coupling part for a plug-in connection for connecting a first component and a second component, has an inner connection portion, in which a head of a pin-like element of the second component can be accommodated by a detent or snap-in connection. In addition, the coupling part has an outer fastening portion, which can be connected to a keyhole of the first component by a bayonet closure. The fastening portion comprises at least one radial contact surface. At least one first radial projection, which forms a bayonet gap for a rotational accommodation of the first component, is arranged at an axial distance from the radial contact surface. At least one second radial pro-
(Continued)

Figure 1:
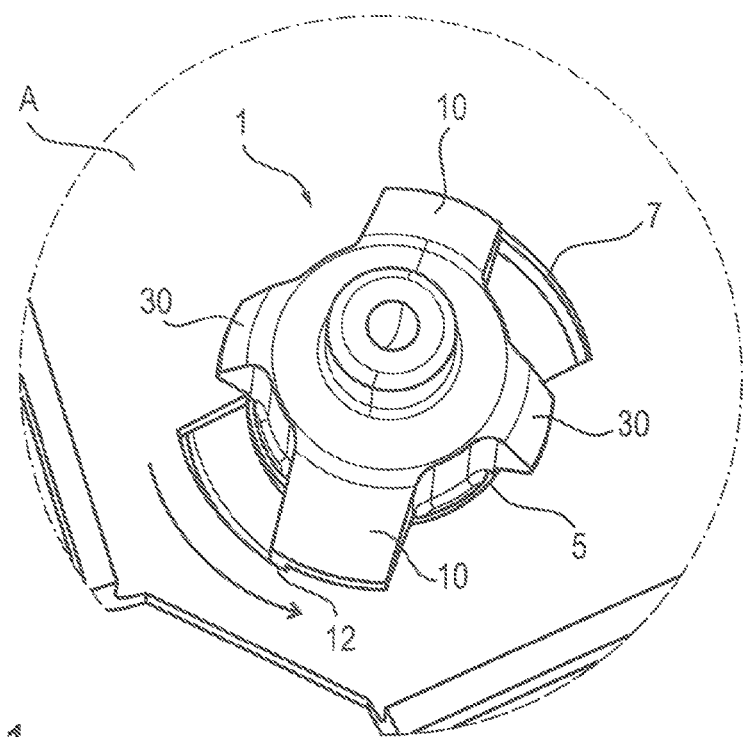

jection, which forms a locking gap for the first component between the second projection and the radial contact surface by a movability directed inward, is arranged at an axial distance from the radial contact surface.

18 Claims, 3 Drawing Sheets

(58) Field of Classification Search
CPC ......... F16C 2350/52; Y10T 24/44026; Y10T 24/4578; Y10T 24/45796; Y10T 403/32155; Y10T 403/32196; Y10T 403/32631; Y10T 403/581; Y10T 403/7007; Y10T 403/49947; Y10T 403/49948; Y10T 403/4987; Y10T 403/75
USPC ...... 403/71, 76, 122, 316, 349; 29/450, 451, 29/467, 525.01, 525.02
See application file for complete search history.

(56) References Cited

U.S. PATENT DOCUMENTS

| | | | |
|---|---|---|---|
| 3,853,414 A | | 12/1974 | Hirano et al. |
| 3,856,422 A | * | 12/1974 | Trefry ............... F16B 21/073 403/122 |
| 4,266,883 A | * | 5/1981 | Riester ............ F16C 11/0657 403/122 |
| 4,552,480 A | * | 11/1985 | McIntyre ............... B60S 1/24 403/134 |
| 4,750,886 A | * | 6/1988 | Portelli ............... E05B 79/12 384/125 |
| 4,927,287 A | * | 5/1990 | Ohkawa ............. F16B 21/086 24/297 |
| 4,993,863 A | * | 2/1991 | Inoue ............... F16C 11/0657 403/133 |
| 5,002,419 A | * | 3/1991 | Eustache ............... B60S 1/24 403/114 |
| 5,013,175 A | * | 5/1991 | Hayden ............... B60S 1/24 15/250.27 |
| 5,580,204 A | | 12/1996 | Hultman |
| 6,206,604 B1 | | 3/2001 | Dembowsky et al. |
| 6,363,569 B1 | * | 4/2002 | Kotlarski ............... B60S 1/38 15/250.32 |
| 7,955,038 B2 | | 6/2011 | Silbereisen et al. |
| 8,322,001 B2 | * | 12/2012 | Ehrhardt ............. B60R 13/0206 24/289 |
| 8,341,804 B2 | * | 1/2013 | Yoshii ............... B60R 13/0206 16/2.1 |
| 8,585,121 B2 | * | 11/2013 | Marx ............... B60R 13/0206 24/289 |
| 2007/0031185 A1 | | 2/2007 | Bertram et al. |
| 2009/0094800 A1 | * | 4/2009 | Reznar ............... F16B 21/075 24/297 |
| 2010/0050401 A1 | * | 3/2010 | Komeno ............... B60R 11/00 24/595.1 |
| 2011/0302765 A1 | * | 12/2011 | Marx ............... B60R 13/0206 29/525.01 |
| 2012/0213580 A1 | * | 8/2012 | Omori ............... B60K 15/067 403/375 |
| 2013/0125372 A1 | * | 5/2013 | van Niekerk ......... F16B 21/065 29/464 |
| 2014/0199116 A1 | * | 7/2014 | Metten ............... B29C 45/16 403/361 |

FOREIGN PATENT DOCUMENTS

| | | |
|---|---|---|
| DE | 202005011420 U1 | 10/2005 |
| DE | 102006020697 B3 | 4/2007 |
| EP | 0902198 A2 | 3/1999 |
| EP | 1746294 A1 | 1/2007 |
| EP | 1960677 B1 | 8/2009 |
| FR | 2184291 A5 | 12/1973 |
| FR | 2608233 A1 | 6/1988 |

OTHER PUBLICATIONS

Written Opinion & International Search Report for PCT/EP2014/061265 dated Aug. 6, 2014, 10 pages.

* cited by examiner

PLUG-IN COUPLING HAVING AN ELASTICALLY DEFORMABLE COUPLING PART AND INSTALLATION METHOD THEREFOR

TECHNICAL FIELD

The present disclosure relates to a plug-in coupling consisting of an elastically deformable coupling part and a pin-like element with a head so that a plug-in connection can be established between a first and a second component with the elastically deformable coupling part and the pin-like element.

BACKGROUND

A plug-in coupling of this type is known from U.S. Pat. No. 5,580,204. In this plug-in coupling, the coupling part consists of a ball socket, an insertion cone as well as a flange formed on the insertion cone. The coupling part can be inserted directly into a hole of a plate-like component. The coupling part is provided with axially running slits, which give the ball socket and the insertion cone the elasticity required to snap in and release the coupling part. Since the socket-shaped coupling part accommodating the ball-shaped head of the pin-like element sits directly in a hole of the first component and the pin-like projection with the ball-shaped head is fastened directly to the second component, the plug-in coupling should only enable a limited vibration decoupling between the first and the second component. Furthermore, the longitudinal direction of the coupling part with running slits causes the stability of the coupling part to be weakened.

Further construction options of such plug-in couplings are described in EP 0 902 198 B1 and EP 1 746 294 A1. These two construction alternatives of a coupling part of a plug-in coupling are characterized by a radially outer lying holding structure with respect to the ball socket of the coupling part. This holding structure is for example pushed laterally into a holder, as shown in EP 0 902 198 B1. According to the other known construction of the coupling part, the coupling part is snapped into the opening of a plate-like component. In both construction alternatives, the ball socket is arranged radially spaced from the surrounding holding structure, whereby a vibration damping within the plug-in coupling as well as a certain tolerance compensation between the coupling part and the pin-like projection to be accommodated are ensured.

The construction options for a coupling part of a plug-in coupling known from the state of the art can only be used, on one hand, in complex holding structures, whereby high installation effort is generated. On the other hand, sufficient hold for the coupling part is not provided by the known snap connection between the coupling part and the component so that the plug-in coupling does not establish a reliable connection.

One object that may be achieved by at least some implementations of the present invention is to provide a coupling part and a plug-in connection that can be established with it, which ensures a reliable connection between two components.

SUMMARY

The above object may be achieved by at least some embodiments of an elastically deformable coupling part according to the independent claim 1, a plug-in coupling according to the independent claim 10, a component with a pin-like element in connection with another component with the coupling part according to the independent claim 11 as well as an installation method of the coupling part according to the independent claim 12.

The elastically deformable coupling part serves to establish a plug-in connection for connecting a first component and a second component. The coupling part has the following features: an inner connection portion, in which a head of a pin-like element of the second component can be accommodated by means of a detent or snap-in connection, and an outer fastening portion, which is connectable with a keyhole of the first component by means of a bayonet closure, wherein the fastening portion comprises at least one radial contact surface, from which at least one first radial projection is arranged at an axial distance, which forms a bayonet gap for a rotational accommodation of the first component, and from which at least one second radial projection is arranged at an axial distance, which forms a locking gap for the first component between the second projection and the at least one radial contact surface by means of a movability directed radially inward.

The coupling part is fastened in a keyhole of the first component by means of a bayonet closure. Such a keyhole is formed by a round or oval opening, which has at least one radial bulge. The at least one radial bulge is preferably designed angularly, wherein other shapes are also preferred as long as the at least one radial projection of the bayonet closure of the coupling part can be inserted through this radial bulge. The bayonet closure between the coupling part and the first component is created in that the coupling part is inserted into the keyhole of the first component and then rotated around its longitudinal axis by a certain angle range. In this manner, the first component is locked on the edge area of the keyhole in the bayonet gap of the coupling part. The edge area of the keyhole is thus accommodated between the first radial projection and the radial contact surface in the bayonet gap formed there through the rotating movement of the coupling part.

In order to reinforce the bayonet closure between the coupling part and the first component, an additional lock or catch of the edge area of the keyhole is provided between the at least one second radial projection and the radial contact surface. For this purpose, the at least one second radial projection is resiliently arranged in the radial direction so that it can move through the central opening of the keyhole during the insertion of the coupling part into the keyhole, so that the edge area of the keyhole locks or snaps in between the at least one second radial projection and the radial contact surface. Thus, for a reliable connection between the coupling part and the first component, the edge area of the keyhole of the first component is held in the bayonet gap and in the locking gap. This connection ensures stability, while at the same time a preferred elasticity of the material of the coupling part and tolerances in the form-fit connection between the coupling part and the pin-like element to be accommodated ensures a sufficient vibration damping and a preferred movability between the coupling part and the pin-like element.

The at least one radial contact surface, which forms the bayonet gap with the at least one first radial projection and the locking gap with the at least one second radial projection, is preferably designed as a circumferential and continuous contact flange. This contact flange extends in the radial direction with respect to the longitudinal axis of the coupling part. With respect to the radial expansion of the circumferential contact flange, it is preferred to design it large enough so that it completely covers the keyhole in the inserted state of the coupling part. In this manner, the contact flange seals the keyhole in the first component. Alternatively, it is also preferred to provide a sealing lip circumferentially on the radial outer edge of the contact flange, which covers and seals the keyhole. The sealing lip preferably has greater flexibility and thus adaptability to unevennesses compared to the contact flange.

According to a further embodiment of the coupling part, respectively two oppositely arranged first radial projections and two radial projections are provided in the fastening region of the coupling part. It is also preferred to use a different number of first and second radial projections in the fastening region of the coupling part. If for example a keyhole with only one radial bulge is used, then a coupling part with optimal fastening stability could be provided with just one first radial projection in combination with for example 2, 3 or even more second radial projections for the formation of the bayonet gap and the locking gap.

According to a further embodiment, the first and second radial projections are arranged circumferentially offset with respect to each other by a certain angle range in the fastening region of the coupling part. In order to avoid, during the rotating fastening of the coupling part in the bayonet gap, that the at least one second radial projection is rotated in the area of a radial bulge of the keyhole, the bayonet gap is blocked after a certain length in coordination with the arrangement of the second radial projection. Due to this construction, the first component in the area of the keyhole cannot be removed from the locking gap during a rotation of the coupling part around its longitudinal axis. Furthermore, it is ensured by the blockade of the bayonet gap that the edge area of the keyhole, i.e. the first component, is always arranged in the bayonet gap and in the locking gap at the same time. This ensures a reliable hold of the coupling part on the first component, wherein a plurality of bayonet gaps and a plurality of locking gaps are preferably arranged distributed circumferentially equally in the fastening portion of the coupling part.

According to a further embodiment of the coupling part, the bayonet gap is formed in a tapering manner at least partially in the radial and/or axial direction of the coupling part, in order to support a reliable hold of the coupling part on the first component.

The keyhole in the first component and the coupling part are produced with certain tolerances compared to each other, in order to facilitate the insertion of the coupling part into the keyhole. Nonetheless, it is required that a firm hold is ensured between the coupling part and the first component after establishment of the bayonet closure between the coupling part and the first component, i.e. after rotating the coupling part around its longitudinal axis and inserting of the edge area of the keyhole into the bayonet gap. The bayonet gap thus has at its start, i.e. on the end facing away from the blocked area or portion, a certain height measured in the axial direction of the coupling part and a certain width measured in the radial direction of the coupling part. In the progression of the bayonet gap towards the blocked area of the bayonet gap, the axial height and/or the radial width of the bayonet gap is reduced. The tapering achieved in this manner in one or in both directions generates a press fit between the coupling part and the first component. A reduction in the axial height of the bayonet gap is achieved in that preferably at least one of the opposite-lying walls of the bayonet gap is arranged in a tapering or angled manner running towards the opposite-lying wall. A tapering of the bayonet gap in the radial direction is preferably achieved in that the outer diameter of the coupling part in the bayonet gap is increased in the progression of the bayonet gap towards the blocked end. In this context, it is also preferred that a plurality of projections is provided on the bordering walls of the bayonet gap, each of which generates locally a tapering of the bayonet gap in the radial and/or axial direction.

Furthermore, it is preferred that the locking gap is also formed partially tapered at least in the axial direction with respect to the coupling part. Such a tapering in the axial direction of the coupling part is for example achievable by means of a rib-like elevation on the radial contact surface opposite the second radial projection or by means of such a rib on the second radial projection or by means of two opposite-lying ribs in the locking gap.

According to a further embodiment of the coupling part, a web-like structure is provided next to an insertion opening of the pin-like element, with which the coupling part can be inserted, preferably screwed and locked or snapped, into the keyhole. Depending on the configuration of the web-like structure of the coupling part, this structure supports the reaching or arriving of the coupling part in the axial direction into the keyhole and the rotating of the coupling part in the keyhole. For this purpose, protruding sections are arranged at least in the axial direction of the coupling part, via which a sufficient torque can be created for screwing the coupling part into the keyhole. These axially protruding sections are preferably oriented in the radial direction in order to facilitate a rotating of the coupling part. Further preferred axial sections, which are preferably arranged parallel to the circumference of the coupling part, support a potential compressing of the coupling part in the radial direction.

The coupling part is preferably made of an elastic plastic or metal. Based on this material selection, the at least one second radial projection is designed sufficiently resiliently so that the locking of the first component in the locking gap is ensured. This material selection also provides the required stability of the coupling part, which is necessary for a reliable bayonet closure between the coupling part and the first component.

The present disclosure also describes a plug-in coupling, which comprises a coupling part according to the embodiments described above as well as a pin-like element with a head. For this purpose, the plug-in coupling preferably has a ball socket in its inner connection portion, in which a ball head of the pin-like element can be accommodated. The inner connection portion is preferably designed complementary or similar to the head of the pin-like element. It is thus also conceivable that the head is formed shaped like an oval, angularly or differently in order to be able to form a detent or snap-in connection with a complementarily formed connection portion of the coupling part.

Furthermore, also disclosed is a component with a pin-like element and a head, which is connected with another component via a coupling part according to the embodiment described above, which is arranged in a keyhole of the other component.

In order to connect the coupling part described above with a component with a keyhole, the following steps are provided: aligning of the coupling part on the keyhole so that the at least one first radial projection is arranged opposite a web-like bulge of the keyhole, inserting of the coupling part in the axial direction into the keyhole and at the same time compressing of the coupling part in the radial direction in order to lock the first component in the locking gap and rotating of the coupling part around the longitudinal axis such that the first component is fastened in the bayonet gap.

While the coupling part is pushed in its axial direction into the keyhole, either a simultaneous compressing of the coupling part takes place by a radial inner edge of the keyhole or by the worker installing the coupling part in the keyhole. The coupling part is preferably inserted so far into the keyhole in the axial direction until the at least one radial contact surface, preferably the circumferential contact flange, rests on the component. In this position, the component locks into the locking gap as soon as the worker releases a radial compression of the coupling part. The coupling part is then preferably rotated around its longitudinal axis, for which the worker for example uses the already above described web-like structure near the insertion opening for the pin-like element. The rotation of the coupling part around its longitudinal axis locks the component in the bayonet gap.

DETAILED DESCRIPTION OF THE DRAWINGS

Figure 2:
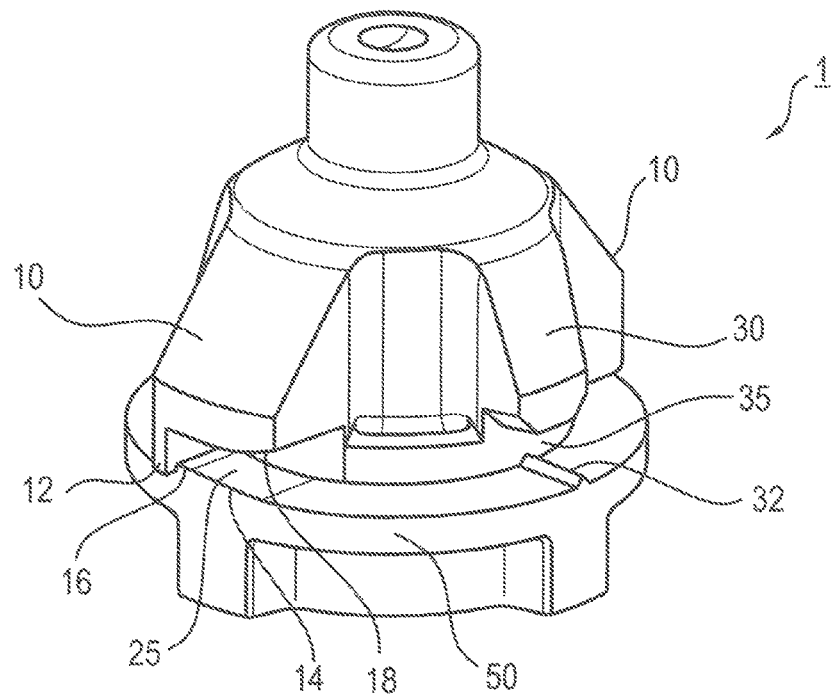
Figure 3:
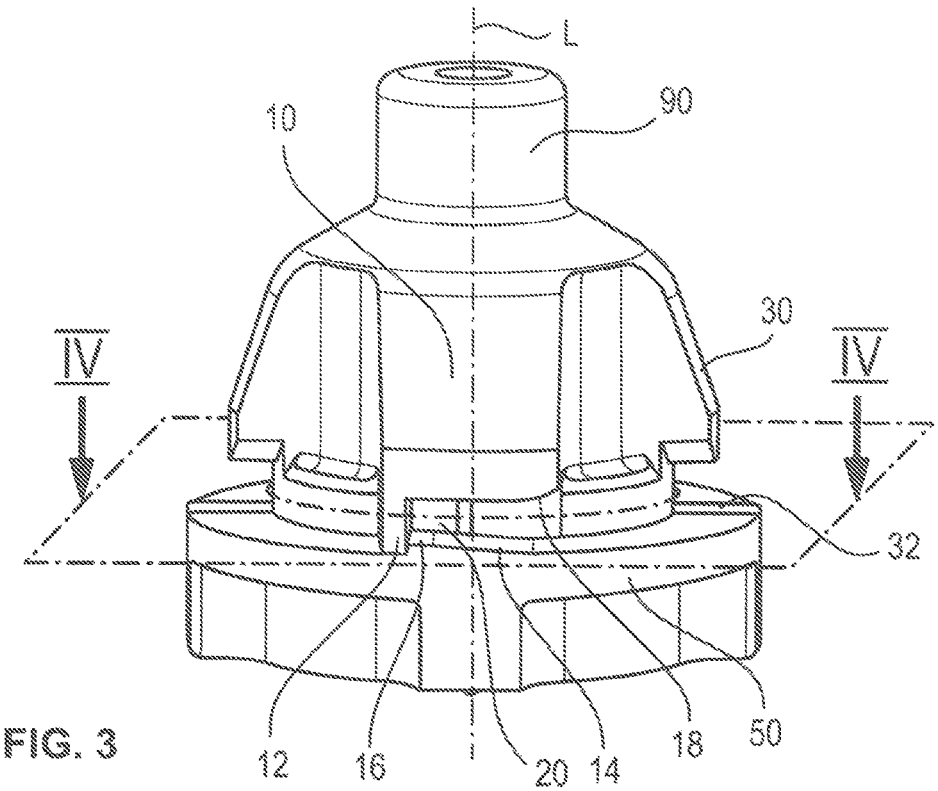
Figure 4:
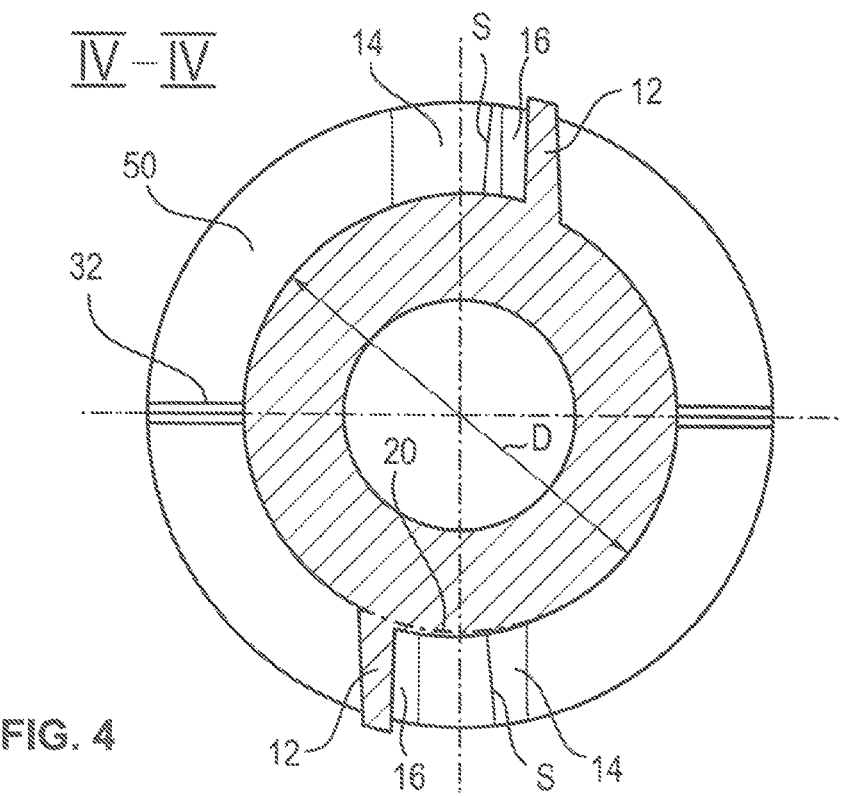
Figure 5:
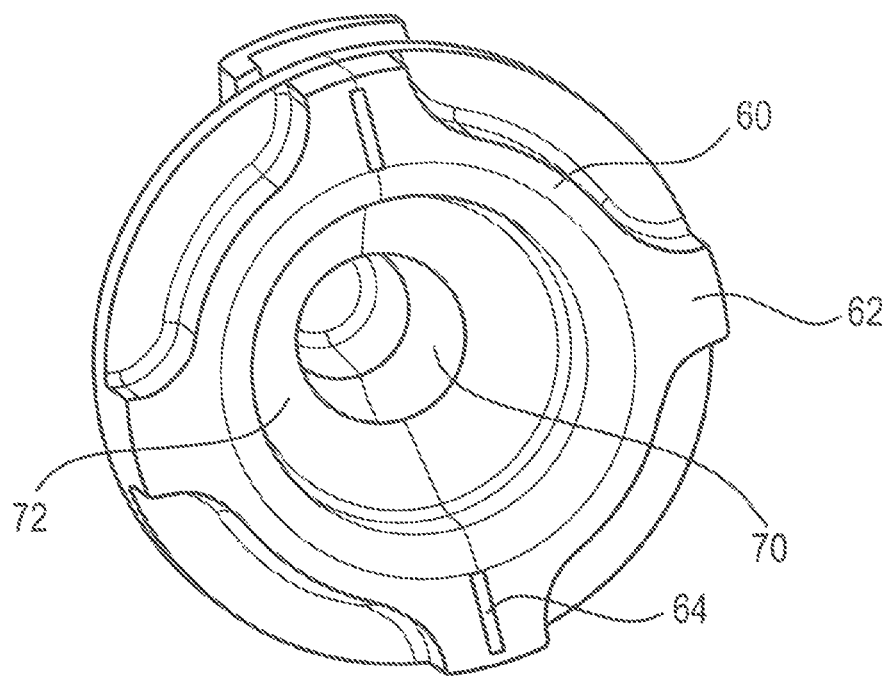
Figure 6:
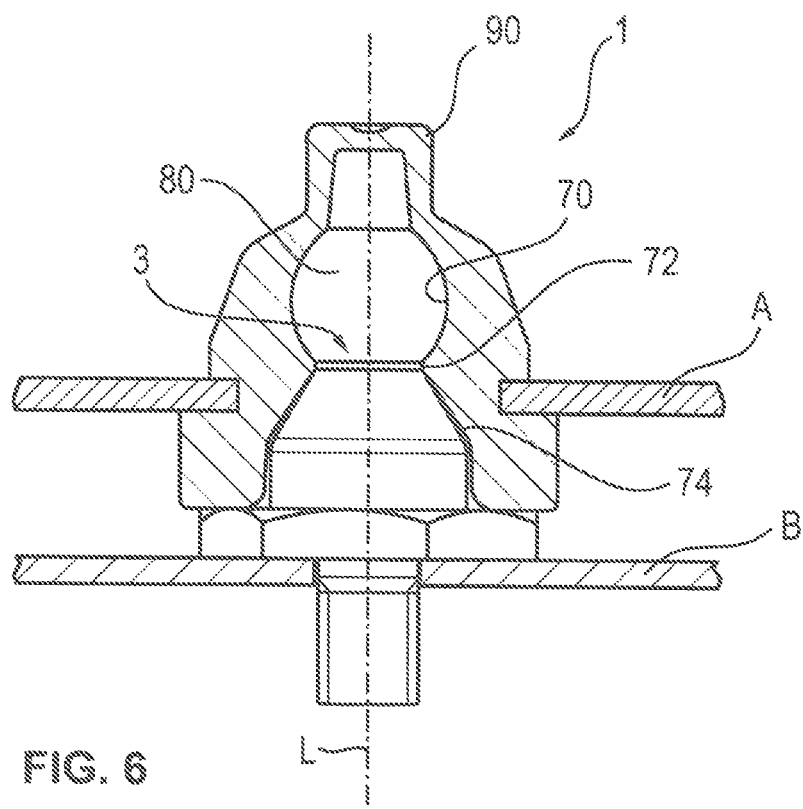

The preferred embodiments of the present disclosure are explained in greater detail in reference to the accompanying drawing. They show in:

FIG. 1 an embodiment of a coupling part of the plug-in connection inserted in a keyhole of a component, FIG. 2 a perspective view of an embodiment of the coupling part, FIG. 3 a side view of an embodiment of the coupling part, FIG. 4 a sectional view along the line IV-IV from FIG. 3, FIG. 5 a perspective view of the insertion opening of the coupling part according to FIG. 3, and FIG. 6 an embodiment of the plug-in connection consisting of coupling part and pin-like element, wherein the coupling part is installed in the first component.

DETAILED DESCRIPTION

FIG. 6 shows in cross-section an embodiment of a plug-in coupling which is comprised of a coupling part 1 and a pin-like element 3. A head 70 of the pin-like element 3 is held in an inner connection portion of the coupling part 1 via a detent or snap-in connection. The coupling part 1 is connected with a first component A via an outer fastening portion. The pin-like element 3 is connected with a second component B, so that the plug-in coupling 1, 3 interconnects in a releasable manner the two components A, B. The pin-like element 3 is preferably a pin with a ball head 80, which is held in a form-fitting manner in a ball socket 70 of the coupling part 1. For the detent or snap-in connection between the coupling part 1 and the pin-like element 3, other form-fitting connections are also preferred, such as e.g. a drop-shaped, elliptical or pyramid-like thickening as a head and an accommodation 70 adjusted in shape thereto. A locking edge 72 is provided in order to support the form-fitting connection, which is explained below based on the example of the ball head 80 and the ball socket 70. The locking edge 72 is arranged in the inner connection portion of the coupling part continuously circumferentially or interrupted in sections. The locking edge 72 reduces a through-hole for the ball head, wherein the through-hole has a diameter that is less than the maximum outer diameter of the ball head 80. During the connection of the coupling part 1 and the pin-like element 3, the ball head 80 overcomes the locking edge 72 during insertion and thus establishes a detent or snap-in connection.

A conical portion 84 also preferably is attached to the ball head 80. The conical portion 84 supports the hold of the ball pin 3 in the coupling part 1. For this, the conical portion 84 is preferably accommodated in a conical accommodation portion 74 of the coupling part 1 adapted to it. A firm seating of the ball pin 3 on the coupling part 1 is achieved by means of the abutment of the conical portion 84 on the conical accommodation portion 74. It is also preferred to form the conical accommodation portion 74 larger than the conical portion 84 of the pin-like element 3. In this manner, a limited movability of the ball pin 3 in a certain solid angle within the coupling part 1 is enabled in order to compensate for example for tolerances between the two components A, B.

The pin-like element 3 is preferably made of a rigid material, such as plastic or metal. The coupling part 1 is made of an elastically deformable or respectively resilient material, such as plastic or metal. The plastics can be elastic plastics, especially silicones and technical rubber.

The material of the coupling part 1 is advantageously selected such that the material elasticity or respectively deformability dampens or completely absorbs vibrations between the components A, B.

As shown based on the embodiment in FIG. 1, the coupling part 1 is installed in a keyhole 5, 7 of the first component A. The keyhole 5, 7 comprises a central bore hole 5. At least one radial web-like bulge 7 extends from this bore hole 5 in the radial direction. Two bulges 7 arranged opposite each other are preferably used in the keyhole 5, 7. The diameter of the central bore hole 5 of the keyhole 5, 7 is adjusted to the outer diameter of the coupling part 1 in a bayonet gap 25 and a locking gap 35 (see below). The shape of the at least one web-like bulge 7 is also preferably adjusted to the shape of a first radial projection 10 (see below), in order to be able to insert this radial projection 10 and the entire coupling part 1 into the keyhole 5, 7.

In order to install or respectively fasten the coupling part 1 in the keyhole 5, 7 of the component A, the coupling part 1 is first inserted axially into the keyhole 5, 7 in the direction of its longitudinal axis L (see FIGS. 3 and 6). The first radial projections 10 are thereby aligned with the bulges 7 such that the radial projections 10 can be inserted through the bulge 7. During the inserting of the coupling part 1 into the keyhole 5, at least one second radial projection 30, preferably a plurality of circumferentially distributed second radial projections 30, are arranged outside of the bulge 7. Due to the axial inserting movement of the coupling part 1 into the keyhole 5, 7, the at least one second radial projection 30 is compressed in the radial direction by the edge of the bore hole 5 and snaps into the keyhole 5, 7 in the further progression of the inserting movement.

While the second radial projections 30 have already locked on the first component A, the bayonet closure is established between the first component A and the coupling part 1 by means of rotating of the coupling part 1 in the direction of the arrow according to FIG. 1. The coupling part 1 is preferably only rotated so far that the second radial projection 30 is arranged outside of the bulges 7. Based on the axial inserting movement of the coupling part 1 into the keyhole 5, 7, the thereby generated locking by the second radial projections 30 and the subsequent rotation of the coupling part 1, a combined bayonet and locking closure is established between the coupling part 1 and the component A.

After the coupling part 1 has been installed in the keyhole 5, 7 of the component A, the pin-like element 3, preferably the ball pin, is inserted into the coupling part 1 and locked there. The plug-in connection between the components A, B is established in this manner. The ball pin is removed from the coupling part 1 to release the plug-in connection between components A, B. The coupling part 1 can preferably be removed from the keyhole 5, 7 in that the coupling part 1 is first rotated opposite the direction of the arrow according to FIG. 1. Through this rotation around the longitudinal axis L of the coupling part, the first radial projections 10 are aligned with the bulges 7 of the keyhole 5, 7. The second radial projections 30 are preferably released from their lock with the component A by means of a compression of the coupling part 1 in the radial direction. After releasing the lock of the second radial projections 30, the coupling part 1 is pulled out of the keyhole 5, 7 parallel to its longitudinal axis L.

The constructive details of the coupling part according to at least some embodiments are shown in FIGS. 2-5. The at least one first radial projection 10, preferably two oppositely arranged radial projections 10, serves to establish the bayonet closure or respectively the bayonet connection with the first component A. Depending on the number of bulges 7 of the keyhole, one or a plurality of first radial projections is provided.

At least one or a plurality of second radial projections 30 is arranged at a certain angle of rotation from the first radial projection 10. Two second radial projections 30 are preferably used lying opposite each other on the coupling part 1. The material of the second radial projections 30 is flexible such that the second radial projections 30 are compressible in the radial direction and thus lockable in the keyhole 5, 7 during inserting of the coupling part 1 into the keyhole 5, 7.

With respect to the longitudinal axis L of the coupling part 1, a radial contact surface 50 is arranged opposite each of the first 10 and the second radial projection 30 in the axial direction. The radial contact surface 50 is preferably formed by a circumferential radial contact flange 50. It is also conceivable to provide the contact flange 50 in a broken manner so that a plurality of circumferentially arranged radial contact surfaces provides the required hold of the coupling part 1. Due to the radial contact surface 50 opposite the first 10 and the second radial projection 30, a bayonet gap 25 and a locking gap 35 is respectively formed, as shown in FIG. 2. The edge area of the keyhole 5, 7 is thus accommodated in the bayonet gap 25 due to the rotation of the coupling part 1 during its installation. The edge area of the keyhole 5, 7 is accommodated lockingly in the locking gap 35 by the axial movement of the coupling part 1 during its installation.

The coupling part 1 is rotated around its longitudinal axis L for accommodating the first component A in the bayonet gap 25 in order to establish the bayonet connection between the coupling part 1 and the component A. In order to prevent the second radial projections 30, already locked on component A, from being released from component A by means of the rotation of the coupling part 1 in the area of at least one bulge 7, the rotation of the coupling part 1 is limited by a restriction of the gap length of the bayonet gap 25. For this, the bayonet gap 25 is blocked by means of an axial projection 12, preferably a wall or a web. The web or the wall 12 extends in the direction of the radial contact surface 50 so that the coupling part 1 can only be rotated so far in the keyhole 5, 7 until a lateral edge of the bulge 7 rests on the web 12. This results in that the at least one second radial projection 30 is arranged at an angular distance from the first radial projection 10 in coordination with the length of the bayonet gap 25 such that it is not arranged in the bulge 7 after the bayonet connection between the coupling part 1 and the component A has been established.

The axial projection 12 is preferably arranged on the end of the bayonet gap 25. Based on this constructive design, the coupling part 1 is only rotatable in one direction in the keyhole 5 in order to establish the bayonet closure. In this manner, the procedure for the coupling part 1 is simplified in the component A because an optional axial insertion and subsequent rotating of the coupling part 1 takes place only in one direction.

In order to support the hold of the coupling part 1 on the component A, the bayonet gap 25 preferably has an insert slope 14 and/or a further insert slope 18. The bayonet gap 25 tapers opposite the direction of the arrow according to FIG. 1 with the help of the at least one insert slope 14, 18. Compared to each other, the sloping surfaces 14, 18 may be arranged tilted at different angles with respect to a radial plane of the coupling part 1. The sloping surfaces 14, 18 serve to compensate for different thicknesses of the component A so that a firm hold of the coupling part 1 is always ensured in the keyhole 5, 7 of the component A. A further sloping or straight surface 16 is preferably arranged on the end of the bayonet gap 25. According to a further embodiment, axial projections, which taper the bayonet gap 25, can also be inserted instead of the at least one insert slope 14, 18.

The outer diameter of the coupling part 1 in the area of the bayonet gap 25 and the locking gap 35 is adjusted to the inner diameter of the bore hole 5 of the keyhole 5, 7. This adjustment is only possible with tolerances in order to first enable a frictionless axial insertion of the coupling part 1 into the keyhole 5, 7. A radial tapering of the bayonet gap 25 is preferably provided for a firm seating of the coupling part 1 in the keyhole 5, 7. It can be seen based on FIG. 4 that the radial width of the bayonet gap 45 is defined by distance S. Furthermore, the inner diameter of the bore hole 5 of the keyhole 5, 7 is shown by the dashed and dotted line in FIG. 5. In order to achieve a radial tapering of the bayonet gap 25, i.e. a reduction of the distance S, the outer diameter D of the coupling part is enlarged locally in the bayonet gap 25. This is shown by the solid line in the bayonet gap 25 compared to the dashed and dotted line, which results in a radial tapering of the bayonet gap 25 opposite the screw-in direction of the coupling part 1 (see FIG. 1). This radial tapering can preferably take place continuously, as shown in FIG. 4. It is also preferred to achieve this radial tapering of the bayonet gap 25 in a locally restricted or selective manner, for example with a radially oriented projection. With the help of this radial tapering of the bayonet gap 25, an improved hold of the coupling part 1 in the keyhole 5, 7 is achieved by means of a radial compression of the coupling part 1 at least in the area of the bayonet gap 25. It is also preferred to provide such a radial tapering in the locking gap 35.

According to a further embodiment, the locking gap 35 has a tapering in the axial direction with respect to the longitudinal axis L of the coupling part 1. According to a constructive alternative, a web 32 is arranged extending in the radial direction on the contact flange 50, in order to form this tapering. With the help of the web 32, a tolerance compensation can be achieved for example with respect to different thicknesses of the component A. According to a further constructive alternative, a sloping surface analogous to the insert slopes 14, 18 of the bayonet gap 25 can be used instead of the web 32.

FIG. 5 shows a perspective view of the coupling part 1 from below. A web-like structure 60 is provided with radially progressing sections 62 next to the insertion opening for the ball pin. By means of the preferred web-like structure 60, the gripping and the pressing in of the coupling part 1 in the axial direction or respectively the locking of the coupling part 1 into the keyhole 5, 7 by the worker is facilitated. Especially the further radial sections 62 also support the rotating of the coupling part 1 in the direction of the arrow (see FIG. 1) in order to establish the bayonet connection.

The web-like structure 60 preferably comprises an orientation aid 64 for the worker. The orientation aid 64 shows the worker where the first radial projections 10 for establishing the bayonet connection are arranged. In this manner, the worker can perform more easily an alignment of the first projections 30 on the bulges 7 of the keyhole 5.

According to a further embodiment, the coupling part 1 comprises an axial projection 90, which is arranged opposite the insertion opening for the ball pin (see FIGS. 3 and 6). The axial projection 90 serves to compensate for tolerances during the installation of the coupling part 1. It is also preferred to forgo the axial projection 90 and to design the coupling part 1 closed or open at the position of the axial projection 90. These different constructive embodiment options can be selected depending on the use of the plug-in coupling, in order for example to optimize the vibration damping behavior of the plug-in coupling.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. An elastically deformable coupling part for a plug-in connection for connecting a first component and a second component, the coupling part comprising:
   a. an inner connection portion, in which a head of a pin element of the second component can be accommodated by means of a detent connection, and an outer fastening portion, which is connectable with a keyhole of the first component by a bayonet closure, wherein
   b. the fastening portion comprises at least one radial contact surface, at least one first radial projection being arranged at an axial distance from the at least one radial contact surface, wherein the at least one first radial projection forms a bayonet gap for a rotational accommodation of the first component, and at least one second radial projection being arranged at an axial distance from the at least one radial contact surface, wherein the at least one second radial projection forms a locking gap for the first component between the at least one second radial projection and the at least one radial contact surface by a movability directed radially inward so that the at least one second radial projection is resiliently arranged in a radial direction, wherein
   c. the at least one first and the at least one second radial projection are arranged circumferentially offset with respect to each other, and
   d. the bayonet gap is blocked after a certain length by means of an axial projection in coordination with an arrangement of the at least one second radial projection so that the first component in an area of the keyhole cannot be removed from the locking gap during a rotation of the coupling part around a longitudinal axis.

2. The coupling part according to claim 1, in which the bayonet gap is formed in a tapering manner at least partially in a radial and/or an axial direction of the coupling part, in order to support a reliable hold on the first component.

3. The coupling part according to claim 2, in which a web structure is provided next to an insertion opening for the pin element, with which the coupling part can be inserted into the keyhole.

4. The coupling part according to claim 1, in which the locking gap is formed at least partially tapered in an axial direction with respect to the coupling part.

5. The coupling part according to claim 1, in which a web structure is provided next to an insertion opening for the pin element, with which the coupling part can be inserted into the keyhole.

6. The coupling part according to claim 1, in which the at least one radial contact surface is formed by a circumferential and continuous contact flange.

7. The coupling part according to claim 6, in which the contact flange is formed as a sealing lip, which completely covers the keyhole due to the radial expansion.

8. The coupling part according to claim 1, which is made of an elastic plastic or metal.

9. A plug-in coupling, which comprises a coupling part according to claim 1 and a pin element with a head.

10. A component with a pin element and a head, which is connected with another component via a coupling part according to claim 1, which is arranged in a keyhole of the other component.

11. The coupling part according to claim 1, in which the bayonet gap is formed in a tapering manner at least partially in a radial and/or an axial direction of the coupling part, in order to support a reliable hold on the first component.

12. The coupling part according to claim 1, in which the locking gap is formed at least partially tapered in an axial direction with respect to the coupling part.

13. The coupling part according to claim 2, in which the locking gap is formed at least partially tapered in an axial direction with respect to the coupling part.

14. The coupling part according to claim 1, in which a web structure is provided next to an insertion opening for the pin element, with which the coupling part can be inserted into the keyhole.

15. An installation method of a coupling part according to claim 1 into a keyhole of the second component, which comprises the steps:
   a. aligning of the coupling part on the keyhole so that the at least one first radial projection is arranged opposite a web bulge of the keyhole,
   b. inserting of the coupling part in an axial direction into the keyhole and at the same time compressing of the coupling part in a radial direction in order to lock the first component in the locking gap and
   c. rotating of the coupling part around a longitudinal axis such that the first component is fastened in the bayonet gap.

16. The installation method according to claim 15, wherein the coupling part is inserted so far into the keyhole in the axial direction until the at least one radial contact surface rests on the component.

17. The installation method according to claim 16, wherein a web structure near an insertion opening for a pin element is used to rotate the coupling part around the longitudinal axis.

18. The installation method according to claim 15, wherein a web structure near an insertion opening for a pin element is used to rotate the coupling part around the longitudinal axis.

* * * * *